United States Patent [19]

Föhl

[11] Patent Number: 5,338,065
[45] Date of Patent: Aug. 16, 1994

[54] BELT TIGHTENER FOR VEHICLE SAFETY BELT SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 970,570

[22] Filed: Nov. 3, 1992

[30] Foreign Application Priority Data

Nov. 7, 1991 [DE] Fed. Rep. of Germany ....... 4136623

[51] Int. Cl.⁵ ............................................. B60R 22/46
[52] U.S. Cl. ..................................... 280/806; 297/480
[58] Field of Search ....................... 280/806, 807, 808; 297/480, 483, 474, 479; 242/107.2

[56] References Cited

U.S. PATENT DOCUMENTS

| | | | |
|---|---|---|---|
| 4,437,623 | 3/1984 | Wyder | 242/107.2 |
| 4,451,062 | 5/1984 | Ziv | 280/806 |

FOREIGN PATENT DOCUMENTS

| | | |
|---|---|---|
| 3715845 | 1/1989 | Fed. Rep. of Germany . |
| 3739356 | 6/1989 | Fed. Rep. of Germany . |
| 2157152 | 10/1985 | United Kingdom . |
| 8705268 | 9/1987 | World Int. Prop. O. . |

*Primary Examiner*—Brian L. Johnson
*Assistant Examiner*—Peter English
*Attorney, Agent, or Firm*—Tarolli, Sundheim & Covell

[57] ABSTRACT

In a vehicle safety belt system a gripping mechanism (16) is arranged at a webbing section (10) extending between a deflection fitting (12) and the belt retractor (14). In the rest condition the webbing is led freely between the oppositely disposed clamping elements of the gripping mechanism (16). The gripping mechanism (16) is connected via a pulling cable (38) to a pyrotechnic or mechanical belt tightener drive. The clamping elements are biased by springs against the webbing whereby a uniform contact on the latter is ensured.

4 Claims, 3 Drawing Sheets

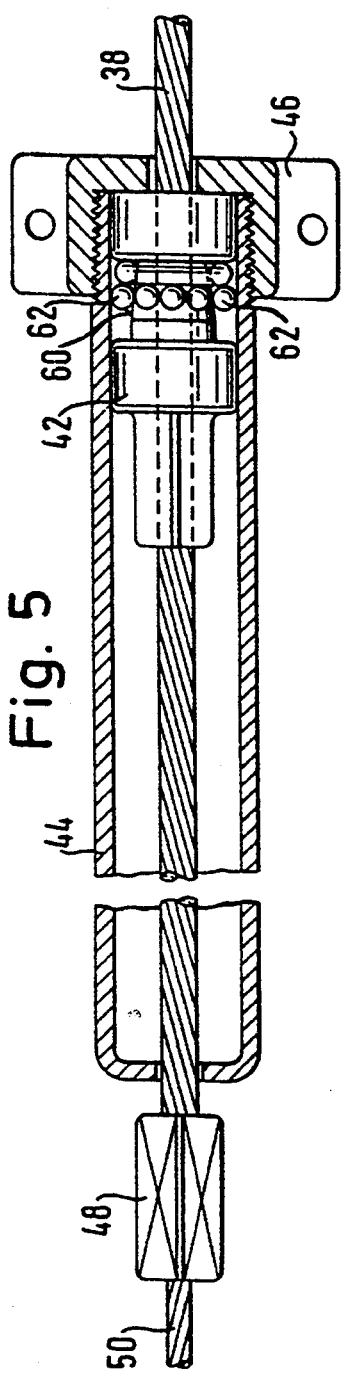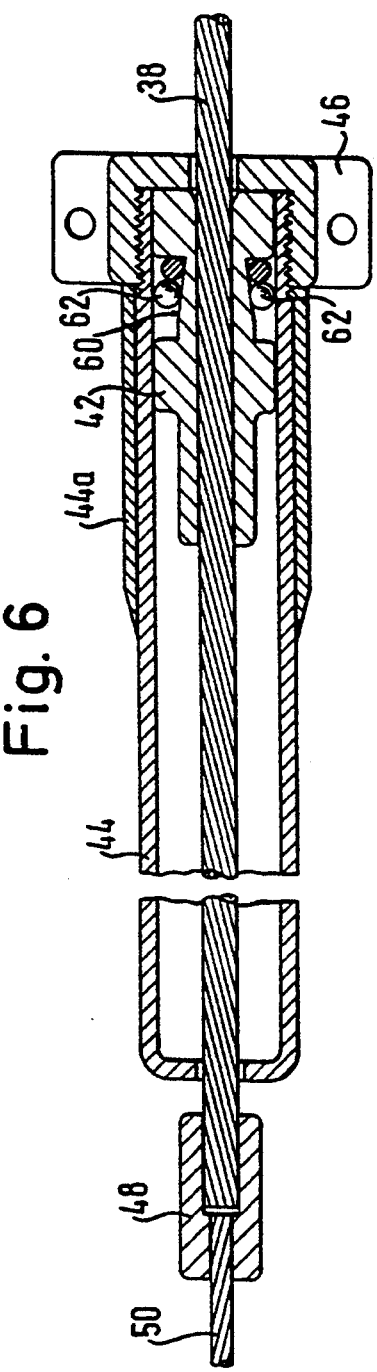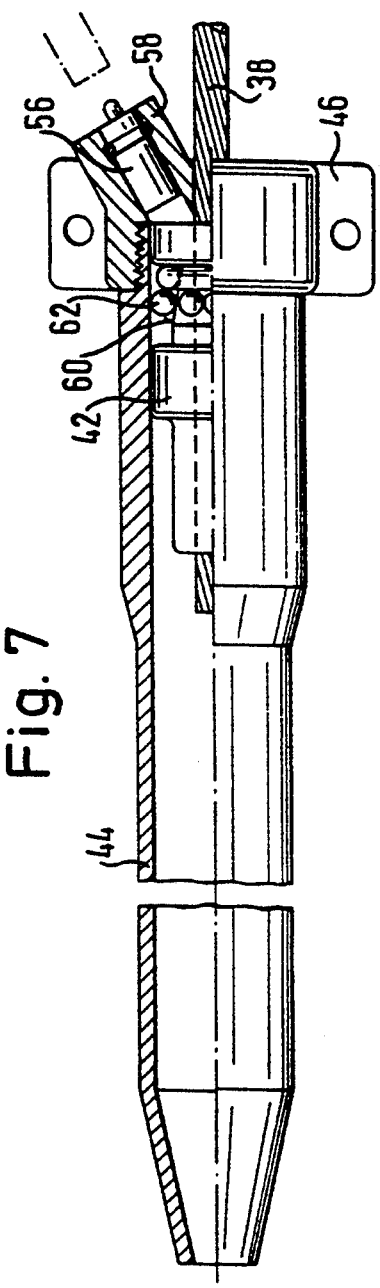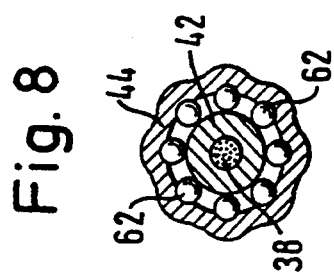

BELT TIGHTENER FOR VEHICLE SAFETY BELT SYSTEMS

The present invention relates to a belt tightener for vehicle safety belt systems wherein a webbing section extends freely between a belt retractor and a deflection fitting. In a safety belt system shown in German Offenlegungsschrift 34 13 488, a belt tightener is provided. The belt tightener has a belt tightener drive with belt gripping means comprising two clamping elements which lie spaced apart opposite each other the webbing extending freely between the clamping elements. The belt tightener drive is connected via a tension transmitting element to the gripping means and the clamping elements are held in a rest position spaced from the webbing section running between them by holding means which can be overcome by the tensile force exerted via the tension transmitting element on the gripping means on activation of the belt tightener drive.

The clamping elements are spread apart by an elastic bracket and are supported in a groove on one side with respect to their longitudinal extension by a projection and held by break members on the other side. With this construction there might be the possibility that the clamping elements will not make plane contact against the webbing.

The object of the invention is to provide a belt tightener with a belt gripping means wherein the clamping elements make a plane contact against the webbing in a reproducible manner to preserve the webbing and to improve its tensile load capacity.

In the belt tightener of the invention the clamping elements are biased by spring force into a gripping position against the webbing.

The clamping elements are pressed by the spring force into engagement with the webbing as soon as, after activation of the belt tightener drive, the holding means by which the clamping elements are held up to that time in their rest position spaced from the webbing are overcome.

An automatic intensifying of the clamping action results if the clamping elements are made in a manner known per se wedge-shaped with the rear face inclined to the webbing and are supported at their rear face on the inner wall of a receiving member to which the tension transmitting element is connected.

Further advantages and features of the invention will be apparent from the following description and from the drawings, to which reference is made.

In the drawings:

FIG. 5 is a longitudinal section through a piston/cylinder return blocking means in a first embodiment;

FIG. 6 is a longitudinal section of a second embodiment of the return blocking means;

FIG. 7 is a longitudinal section of a combined drive/return blocking mechanism assembly; and FIG. 8 is a cross-section through the piston and cylinder wall of a return blocking means after belt tightening and energy transformation.

Figure 1:
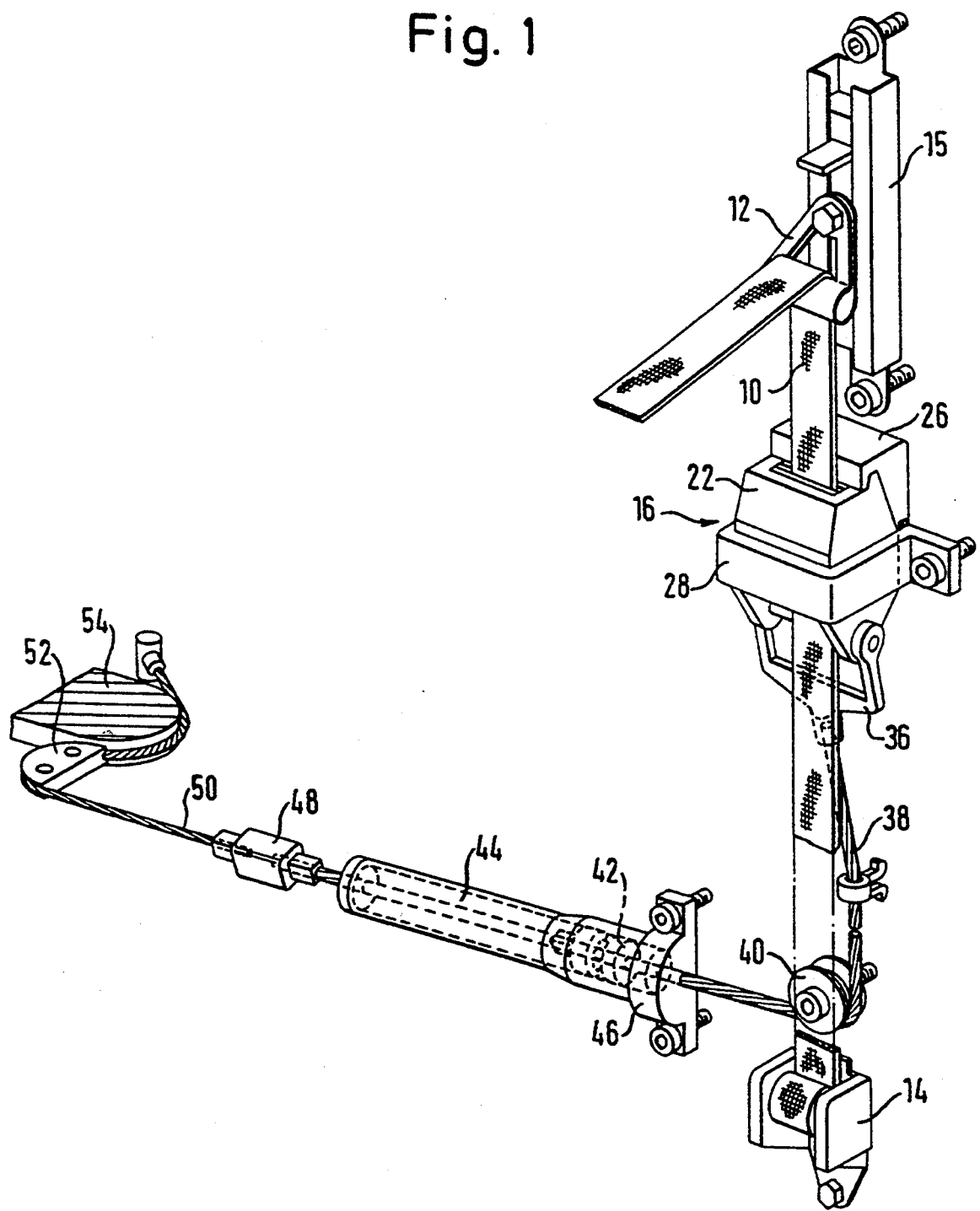
FIG. 1 is a perspective view of a vehicle safety belt system with a belt tightener.
Figure 2:
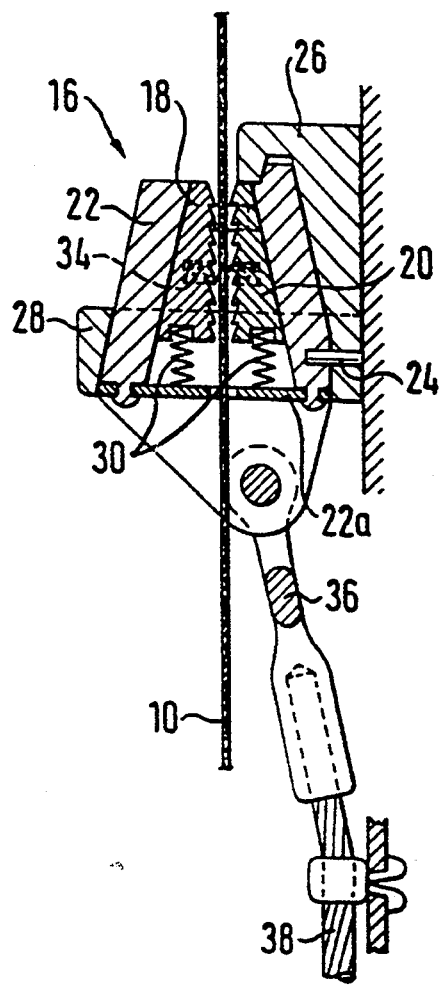
FIG. 2 is a sectional view of a gripping means of the belt tightener according to FIG. 1.
Figure 3:
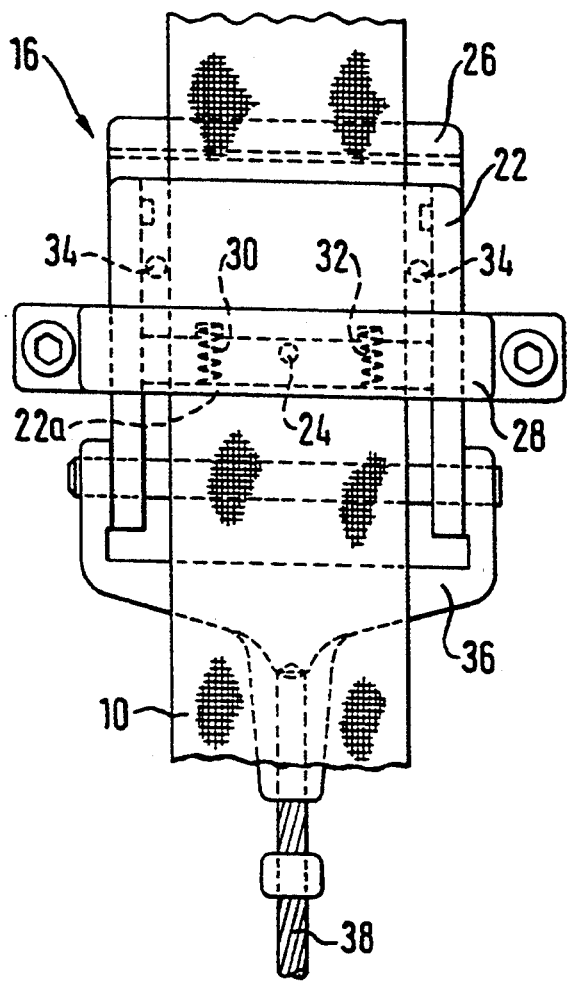
FIG. 3 is a plan view of the gripping means shown in FIG. 2.
Figure 4:
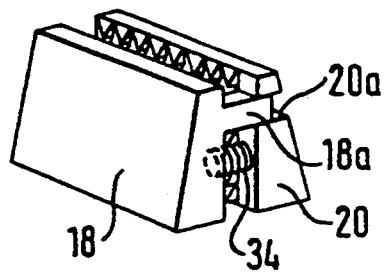
FIG. 4 is a perspective view of two clamping elements of the gripping means shown in FIGS. 2 and 3.

In the safety belt system shown in FIG. 1 a webbing section 10 extends approximately vertically from a deflection fitting 12 to a belt retractor 14 which is accommodated in the B post of the vehicle, as is a vertical adjusting means 15 on which the deflection fitting 12 is mounted for vertical adjustment. Arranged on the belt webbing 10 is a gripping mechanism or means 16. As shown in detail in FIGS. 2, 3 and 4, said gripping means 16 consists of two wedge-shaped clamping members 18, 20 which are arranged on either side of the webbing section 10 at a slight distance from the latter, and a receiving or reaction member 22, in the interior of which the clamping members 18, 20 are received and at the inner faces of which inclined to the direction of the webbing path the rear faces of the clamping members 18, 20 inclined at the same angle to the direction of the webbing path are supported. In the rest position shown in the Figures the receiving member 22 is fixed by a shear pin 24 to a base or supporting member 26 which is anchored to the vehicle bodywork. A holding 28 secured by means of screws to the vehicle bodywork engages round the receiving member 22 and holds the latter in a defined rest position. At its upper end in the drawings the base 26 forms a stop for the adjacent end face of the clamping member 20. As apparent in FIG. 4, the latter is connected in force-locking manner to the opposite clamping member 18 by lateral strips 18a each engaging into a corresponding groove 20a of the clamping member 20. Each clamping member 18, 20 is biased by two pressure springs 30, 32 in the direction of the webbing path towards the deflection fitting 12 and as a result the upper end face of the clamping member 20 is held in engagement with the stop of the base 26. The pressure springs 30, 32 are supported at their side remote from the clamping members 18, 20 on a bottom plate 22a of the receiving member 22. The clamping members 18, 20 are pressed apart by two pressure springs 34 arranged on either side of the webbing and pressed into engagement with the inner faces of the receiving member 22. The webbing section 10 runs freely between the engagement faces of the clamping elements 18, 20 preferably provided with a toothing, at a slight distance from said faces. By means of a pivotal stirrup member 36 a tension transmitting element in the form of a pulling cable 38 is connected to the receiving member 22. The pulling cable 38 is led over a deflection pulley 40 and at its end remote from the gripping means 16 is connected to a piston 42 which is displaceably received in the bore of a cylinder 44. The cylinder 44 is secured to the vehicle bodywork by means of a mounting means 46. As apparent in FIGS. 5 and 6, the pulling cable 38 is led axially through the piston 42 and via a connecting means 48 connected to a further pulling cable 50. Said pulling cable 50 is guided over a deflection means 52 to a vehicle component 54 in the front region of the vehicle, led arcuately round said component and secured at its free end to a rigid vehicle bodywork region. The vehicle component 54, for example part of the gearbox of the vehicle, executes on accident-induced deformation of the front vehicle region a relative movement with respect to the vehicle passenger compartment to which the end of the pulling cable 50 is anchored. By this relative movement the length of the pulling cable 50 between the deflection means 52 and the piston 42 is shortened so that a tension is transmitted via the pulling cable 38 and the stirrup member 36 to the receiving member 22. Thus, in this embodiment the belt tightener drive is derived from a vehicle component which on accident-induced deformation of the front vehicle region executes a relative movement with respect to the passenger compartment of the vehicle.

In contrast, in the embodiment shown in FIG. 7 a pyrotechnical drive is provided which comprises a gas generator cartridge 56 which is inserted into a tube piece 58 which is connected to the one end of the cylinder 44 and which opens out into the cylinder chamber in front of the piston 42. On firing the gas generator cartridge 56 the piston 42 is advanced in the cylinder 44 by the pressure gases then generated and as a result a tension is exerted on the pulling cable 38.

When a tensile force is exerted on the receiving member 22 on activation of the belt tightener drive, the shear pin 24 is first sheared off. Then, the receiving member 22 is moved downwardly, the clamping elements 18, 20 being simultaneously advanced by the pressure springs 30, 32 so that their engagement faces come into engagement with the webbing, since the pressure springs 30, 32 are of greater dimensions than the pressure springs 34. Due to the wedge form of the clamping elements 18, 20, on further downward movement of the receiving member 22 the clamping of the webbing is automatically enhanced. The webbing gripped by the gripping means is now entrained and displaced in the direction of the belt retractor 14, the belt slack being taken out of the belt system. The travel of the belt tightener is terminated at the latest when the piston 42 has arrived at the free end of the cylinder 44. In the embodiment shown in FIG. 1 the connecting means 48 is so dimensioned that on further increase of the tensile force via the pulling cable 50 it yields and uncouples the pulling cable 50 from the pulling cable 38.

The piston 42 is freely moveable in the cylinder 44 in the direction towards the free end thereof, i.e. in the tightening direction. In the opposite direction its movement is however obstructed by a ball clamping mechanism. This ball clamping mechanism consists of a plurality of balls 62 which are distributed over the periphery of a ramp face 60 on the piston 42 and the outer periphery of which lies opposite the inner wall of the cylinder 44. On movement of the piston 42 in the direction of the deflection pulley 40, the balls 62 are pressed by the ramp face 60 of the piston 42 radially outwardly against the inner wall of the cylinder 44. A further movement is possible only on plastic deformation of the wall of the cylinder 44. On said plastic deformation work is done so that an energy transformation desired for diminishing load peaks in the webbing takes place as soon as a predetermined value of the tensile load in the pulling cable 38 is exceeded. The construction of piston 42 and cylinder 44 shown thus constitutes a return blocking mechanism and at the same time an energy transducer for diminishing load peaks in the webbing. FIG. 8 shows the plastic deformation of the wall of the cylinder 44.

In the embodiments shown in FIG. 6 and 7 the end of the cylinder 44 adjacent the mounting means 46 is thickened in order to increase the threshold above which a plastic deformation takes place. By the dimensioning of the wall thickness of the cylinder 44 the energy transducer can be equipped with the desired characteristic. In the embodiment according to FIG. 6 the cylinder 44 is thickened by a sleeve 44a pushed thereon; in the embodiment according to FIG. 7 the wall thickness of the cylinder 44 is increased in the corresponding region.

Apart from the forms of a belt tightener drive described other known constructions are possible, for example mechanical drives with a spring held under tension.

What is claimed is:

1. A belt tightener for vehicle safety belt systems comprising:
   a belt retractor;
   a deflection fitting;
   a safety belt which has a webbing section running freely between said belt retractor and said deflection fitting;
   belt gripping means having a pair of clamping elements which lie spaced apart opposite each other, said webbing section extending freely between said clamping elements;
   spring means biasing said clamping elements to an engagement position in contact with said webbing section;
   holding means which hold said clamping elements in a rest position spaced from said webbing section; and
   a belt tightener drive connected to said gripping means by a tension transmitting element;
   said holding means having a portion cooperating with said belt tightener drive and said tension transmitting element for releasing said clamping elements upon an occurrence of a tensile force exerted by said belt tightener drive and transmitted to said gripping means through said tension transmitting element;
   said clamping elements are wedge-shaped and each have a rear face inclined to said webbing section, said gripping means comprising a reaction member extending around said clamping elements and having an inner wall, each of said rear faces bearing on said inner wall and said tension transmitting element being connected to said reaction member;
   said spring means act on said clamping elements in a direction parallel to a direction in which said webbing section extends between said clamping elements, said gripping means comprising a supporting member provided with an abutment, said reaction member being supported by said supporting member and said spring means urging said clamping elements against said abutment.

2. The belt tightener according to claim 1, wherein said holding means are formed by at least one shearable pin connecting said reaction member with said supporting member.

3. A belt tightener for vehicle safety belt systems comprising:
   a belt retractor;
   a deflection fitting;
   a safety belt which has a webbing section running freely between said belt retractor and said deflection fitting;
   belt gripping means having a pair of clamping elements which lie spaced apart opposite each other, said webbing section extending freely between said clamping elements;
   spring means biasing said clamping elements to an engagement position in contact with said webbing section;
   shearable holding means which hold said clamping elements in a rest position spaced from said webbing section;
   and a belt tightener drive connected to said gripping means by a tension transmitting element;

said holding means being dimensioned to be sheared off by tensile force exerted by said belt tightener drive and transmitted to said ripping means through said tension transmitting element; and said clamping elements being movable in a direction towards said belt retractor under tension transmitted by said tension transmitting element from said belt tightener drive to said clamping elements while said webbing section is gripped between said clamping elements.

4. The belt tightener according to claim 3, wherein said clamping elements are wedge-shaped and each have a rear face inclined to said webbing section, said gripping means comprising a reaction member extending around said clamping elements and having an inner wall, each of said rear faces bearing on said inner wall and said tension transmitting element being connected to said reaction member.

* * * * *